United States Patent [19]

Field et al.

[11] Patent Number: 4,495,807

[45] Date of Patent: Jan. 29, 1985

[54] PRECISION LIQUID LEVEL SENSOR

[75] Inventors: Michael E. Field; William H. Sullivan, both of Albuquerque, N. Mex.

[73] Assignee: The United States of America as represented by the United States Department of Energy, Washington, D.C.

[21] Appl. No.: 469,596

[22] Filed: Feb. 24, 1983

[51] Int. Cl.³ .............................................. G01F 23/28
[52] U.S. Cl. .................................. 73/290 R; 73/304 R; 324/58.5 B
[58] Field of Search ....................... 73/290 R, 304 R; 324/58.5 A, 58.5 B

[56] References Cited

U.S. PATENT DOCUMENTS

| 2,596,288 | 5/1952 | Robertson | 324/58 A |
| 3,398,578 | 8/1968 | Dozer | 73/304 R |
| 3,424,002 | 1/1969 | Johnson | 73/290 R |
| 3,474,336 | 10/1969 | Alford | 324/58 A |
| 3,703,829 | 11/1972 | Dougherty | 73/290 R |
| 3,812,422 | 5/1974 | DeCarolis | 324/58.5 B |
| 3,832,900 | 9/1974 | Ross | 73/290 R |
| 3,853,005 | 12/1974 | Schendel | 324/58.5 B |

OTHER PUBLICATIONS

"Alternate Liquid Level Measurement Systems" (Fy 1978 Devel. Work), Allied General Nuclear Services, Rep No. Agns 1040,2.2-50, 10/1978, pp.H1-H6.

Primary Examiner—Daniel M. Yasich
Attorney, Agent, or Firm—George H. Libman; Albert Sopp

[57] ABSTRACT

A precision liquid level sensor utilizes a balanced R. F. bridge, each arm including an air dielectric line. Changes in liquid level along one air dielectric line imbalance the bridge and create a voltage which is directly measurable across the bridge.

9 Claims, 2 Drawing Figures

PRECISION LIQUID LEVEL SENSOR

The United States Government has rights in this invention pursuant to Contract Number DE-AC04-76DP00789 between the Department of Energy and Sandia Corporation.

BACKGROUND OF THE INVENTION

The present invention relates generally to a liquid level detector and more particularly to a liquid level detector utilizing an air dielectric transmission line and an R. F bridge.

Although many different types of liquid level sensors are known, a continuing need exists for a sensor which is suitable for use in hostile environments, reliable, and accurate over large measurement ranges. Such a sensor would be especially useful in measuring the coolant level in a nuclear reactor, where the reactor core must be immersed in coolant at all times. Should the coolant level fall below the top of the core, the reactor operators must be warned in order that they may take necessary steps to prevent a core meltdown.

One previous liquid level measuring system that has been developed for use with nuclear reactor cooling systems is shown in U.S. Pat. No. 4,170,135 by Glen Booman et al. In this patent, an air dielectric coaxial transmission line is lowered within the container containing the liquid to be measured. The fundamental resonant frequency of the portion of the coaxial cavity which does not contain liquid is inferred from several measurements of the harmonically related cavity resonances. The fundamental resonant frequency is then used to calculate the length of the liquid-free portion of the coaxial cavity and, thereby, the level of liquid in the container. As a resonant system, the Booman sensor must be operated at frequencies which are determined by the geometry of the probe itself. In addition, a readout of the distance requires some calculation, usually with a computer.

SUMMARY OF THE INVENTION

It is an object of this invention to provide a liquid level sensor with a direct distance output.

It is another object of this invention to provide a liquid level sensor which is survivable in 800° C. liquid sodium.

It is a further object of this invention to provide a liquid level sensor with a linear output over a liquid level change ranging from a few inches to several feet, the linear range being set by the operating frequency.

Additional objects, advantages and novel features of the invention will become apparent to those skilled in the art upon examination of the following description, or may be learned by practice of the invention. The objects and advantages of the invention may be realized and attained by mans of the instrumentalities and combinations particularly pointed out in the appended claims.

To achieve the foregoing and other objects, and in accordance with the purpose of the present invention, as embodied and broadly described herein, the liquid level sensor of this invention may comprise a power splitter for splitting an electrical signal into reference and measurement signal paths, with each signal path including a hybrid tee. The measurement path includes an air dielectric line having one end connected to the measurement tee. The reference path includes a transmission line of variable electrical length connected to the reference tee. The third terminal of each hybrid is connected to a null detector. The change in impedance caused by liquid moving along the measurement air dielectric line causes an imbalance in the circuit which is detected by the null meter, giving a direct reading of liquid level.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
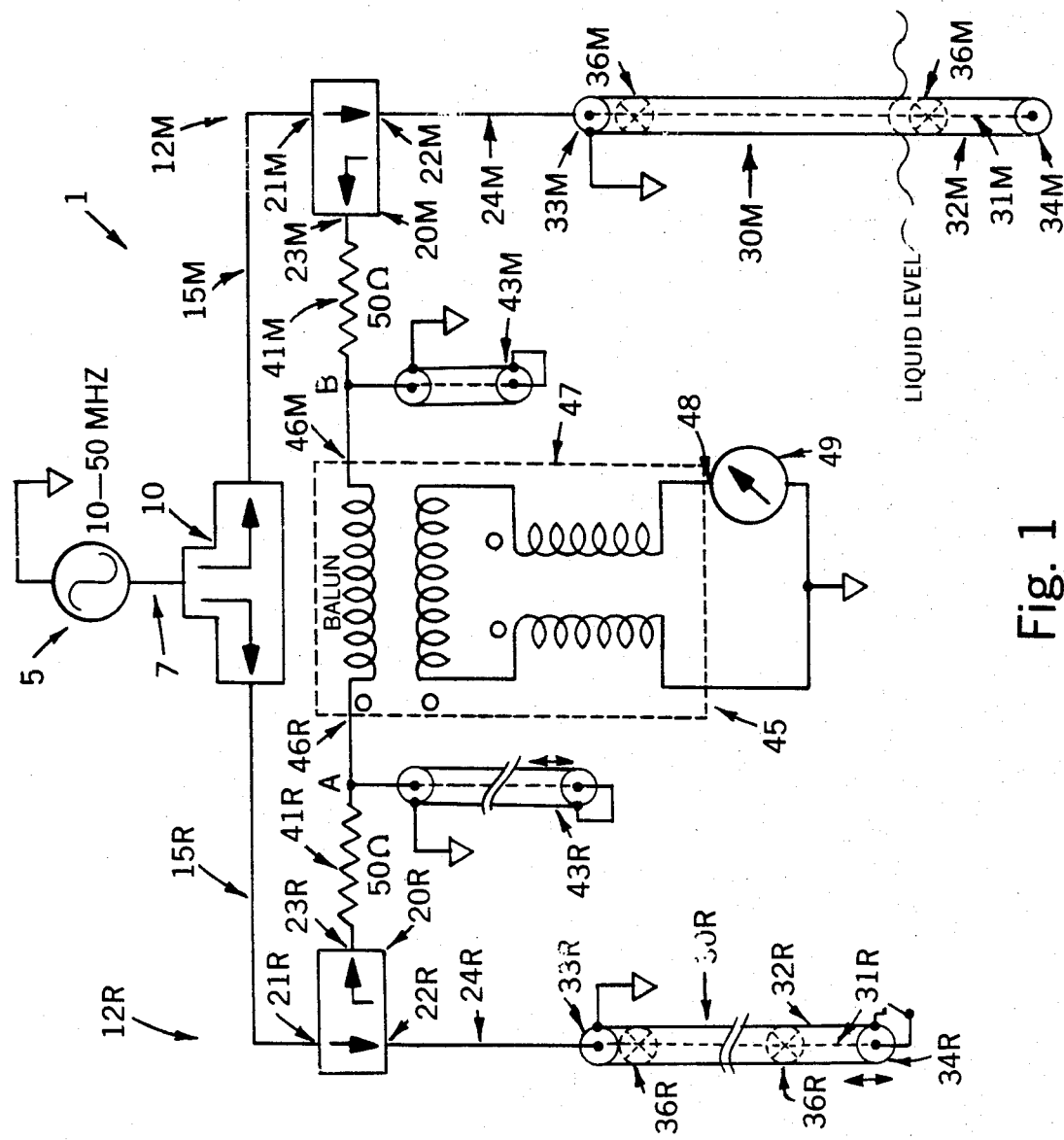
FIG. 1 is a schematic of the invention.

As shown in FIG. 1, liquid level sensor 1 includes signal generator 5 for generating an electrical signal. The output of generator 5 is connected to power splitter 10 by transmission line 7. Power splitter 10 equally divides the electrical signal into two approximately equal paths: reference path 12R and measurement path 12M. Each path consists of a transmission line 15R, 15M extending from power splitter 10 to a hybrid or directional coupler 20R,20M.

Hybrids and directional couplers are well known electronic devices which, ideally, allow transmission of energy only from a first port 21R,21M to a second port 22R,22M, and from the second port 22R,22M to a third port 23R,23M. Of course, commercially available hybrids and directional couplers have some extraneous leakage between unintended ports; however, many devices are available which transmit substantial power in the intended manner. Also, the resultant non-ideal signal components are balanced out during the calibration procedure as hereinafter described.

In a preferred embodiment, an air dielectric line 30R,30M is connected to second port 22R,22M by transmission line 24R,24M. An air dielectric line is a section of stiff transmission line which utilizes air as the dielectric medium. In the illustrated embodiment, lines 30R,30M are coaxial transmission lines with each line having a center conductor 31R,31M and a coaxial conductor 32R,32M spaced from the center conductor by dielectric spacers 36R,36M. One end 33R,33M of the dielectric line is connected to transmission line 24R,24M. Other end 34M of transmission line 30M is open circuited. Other end 34R of transmission line 30R is either open or short circuited depending on the use as hereinafter described. Although this alternative impedance is represented in FIG. 1 by a switch, it is understood that a shorting plug will either be used or not used at end 34R to achieve the desired impedance. Line 30R also may comprise an air dielectric trombone line which enables the length of the line to be adjusted for calibration purposes as hereinafter described.

Hybrid third port 23R,23M is connected to an input terminal 46R,46M of null detector 45 by an impedance matching network which includes termination 41R,41M and short-circuit terminated adjustable stub 43R,43M, where the inductive reactance of 43R,43M is made much less than 50 ohms, the nominal system line impedance. As shown in FIG. 1, stub 43R may be of adjustable length for nulling purposes as hereinafter described.

It is to be understood that the mechanical stubs 43R,43M and air transmission line 30R may be replaced by other conventional transmission lines including well known mechanical or electrical phase shifters.

In the preferred embodiment, null detector 45 includes balun or 180 degree power combiner 47, having inputs 46R,46M and output 48, such that the output at 48 is the vector difference of the inputs at 46R and 46M. A detector 49 is connected to output 48. Detector 49 may typically be a voltmeter or an RF detector, depending on the frequency being measured.

The principle of operation of the invention is as follows. The circuit comprises an R. F. bridge. Both legs 12R,12M of the bridge are short circuited for highly conductive liquids, air transmission measurement line 30M being shorted by the liquid surface and air transmission reference line 30R being terminated at 34R by a short circuit. For dielectric liquids, both legs of the bridge are open circuited. By making the electrical length of paths 12R,12M identical, the reflected signals arrive at second ports 22R,22M of hybrids 20R,20M, respectively, exactly in phase. In this embodiment, this exact phase relationship is attained by adjusting reference line 30R through the use of an air dielectric trombone line. The amplitude of the two in-phase signals at the null detector inputs 46R,46M are balanced by adjustments to reactance stub 43R, which provides very fine amplitude control. In this manner, the voltages at 46R,46M can be precisely balanced in both amplitude and phase, thus producing zero output from detector 49.

In use, the system is installed, liquid is applied against measurement line 30M to its nominal level, and the bridge is nulled, as previously described. As the liquid level changes along line 30M, the reflected signal from this termination of the line is returned through hybrid 20M to null detector 45.

Following a level change, the reflected reference and measurement signals are no longer in phase, thus producing a detectable output signal at output port 48. Phase shift of the reflected measurement signal is directly proportional to the change in liquid level. The voltage output 48 from the balun or 180 degree power combiner 47 is directly proportional to the change in liquid level for changes producing less than approximately six degrees of phase shift.

For a given linear operating range, $\Delta L$, the maximum operating frequency, $f$, can be computed from $f = c/60 \times \Delta L$, where c is the speed of light. Since the bridge is not a tuned system, its operating frequency, and hence its linear operating range, is only constrained by the frequency response characteristics of the hybrids/directional couplers and/or the balun/power combiners.

Figure 2:
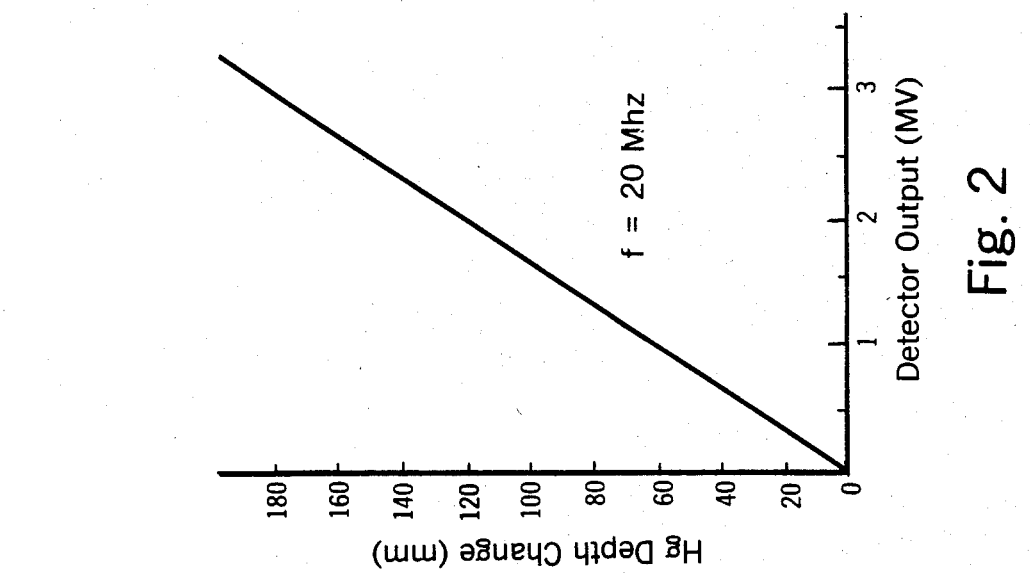
FIG. 2 is a graph showing the performance of the invention.

FIG. 2 shows the calibration curve for a 20 MHz test system constructed in accordance with the embodiment of FIG. 1 for the measurement of a column of mercury. An HP 8405A Vector Voltmeter was utilized for output detector 49. Although the measurement range was limited by the depth of the available mercury column, at 20 MHz the system would be linear over approximately 250 mm. The resolution, R, of the system with this voltmeter is approximately $R = 250/\Delta L$. Measurements of greater depth changes can be accomodated by the system if detector 49 is calibrated in accordance with the sinusoidal change of voltage as a function of depth. In addition, if detector 49 is able to sense phase polarity, the linear range of operation is doubled as the output of balun 48 is linear for $\pm 6°$ around a null point.

The particular equipment discussed above are cited merely to illustrate a particular embodiment of the invention. It is contemplated that the use of this invention may involve components having different sensitivities and sizes as long as the principle, using air dielectric lines in a bridge circuit, is followed. A sensor so constructed will provide a sensitive, convenient device for the measurement of liquid levels in a variety of environments. It is intended that the scope of the invention be defined by the claims appended hereto.

We claim:

1. A precision liquid level sensor comprising:
   output port means of a signal generator for providing an electrical signal;
   null detector means for detecting a signal difference across two input terminals; and
   power splitter means connected to said output port means for dividing said output signal into reference and measurement signal paths, each said path including:
   hybrid means for conducting electrical signals substantially only from a first port to a second port and from said second port to a third port, said first port being connected to said power splitter means and said third port being connected to an input terminal of said null detector means;
   said measurement path including an air dielectric line having one end connected to said second port; and
   said reference path including a transmission line connected to said second port;
   at least one of said paths including means for nulling the signal at said null detector means when a signal is applied to said output port;
   whereby after said system is nulled, a change in liquid level along said air dielectric line of said measurement path causes a change in the signal at said null detector means, providing an indication of the change in the liquid level.

2. The sensor of claim 1 wherein said reference path transmission line is an air dielectric line.

3. The sensor of claim 2 wherein each of said air dielectric lines is substantially identical and comprises a rigid metal center conductor, a coaxial metal outer conductor and dielectric spacer means for supporting said center conductor with respect to said coaxial conductor.

4. The sensor of claim 1 wherein said null detector means comprises a means for vectorially subtracting the two signals appearing at the input terminals of said detector means, and output terminals for connection to second detector means for indicating balance-unbalance conditions.

5. The sensor of claim 1 wherein said means for nulling comprises phase adjustment means for making the electrical length of each path identical from the second port to the end of said line, and amplitude adjustment means for making identical the amplitude of each signal at the input terminals of said null detector means.

6. The sensor of claim 5 wherein said phase adjustment means comprises an adjustable trombone line for adjusting the length of said line in said reference path; and said amplitude adjustment means comprises an adjustable shorted stub line connected between the third port and the input terminal on the reference line of the null detector means.

7. The sensor of claim 1 further including a signal generator for providing an RF signal at said output port.

8. The sensor of claim 2 wherein said air dielectric line in said reference path is open circuited at the other end to enable measurement of nonconducting liquids.

9. The sensor of claim 2 wherein said air dielectric line in said reference path is short circuited at the other end to enable measurement of conducting liquids.

* * * * *